United States Patent
Wang et al.

(10) Patent No.: US 10,009,844 B2
(45) Date of Patent: *Jun. 26, 2018

(54) BEHAVIOR FOR WIRELESS TRANSMIT/RECEIVE UNIT AND MAC CONTROL ELEMENTS FOR LTE DRX OPERATIONS

(71) Applicant: INTERDIGITAL PATENT HOLDINGS, INC., Wilmington, DE (US)

(72) Inventors: Jin Wang, Princeton, NJ (US); Guodong Zhang, Syosset, NY (US); Stephen E. Terry, Northport, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/450,121

(22) Filed: Mar. 6, 2017

(65) Prior Publication Data
US 2017/0181083 A1 Jun. 22, 2017

Related U.S. Application Data (63) Continuation of application No. 15/180,524, filed on Jun. 13, 2016, now Pat. No. 9,629,084, which is a (Continued)

(51) Int. Cl.
*H04W 4/00* (2018.01)
*H04W 52/02* (2009.01)
(Continued)

(52) U.S. Cl.
CPC ... *H04W 52/0225* (2013.01); *H04W 52/0209* (2013.01); *H04W 52/0216* (2013.01);
(Continued)

(58) Field of Classification Search
None
See application file for complete search history.

(56) References Cited

U.S. PATENT DOCUMENTS

| 5,185,737 A | 2/1993 | Nassehi et al. |
| 7,924,755 B2 | 4/2011 | Xu et al. |
| | (Continued) | |

FOREIGN PATENT DOCUMENTS

| CN | 1820433 A | 8/2006 |
| CN | 1820434 A | 8/2006 |
| | (Continued) | |

OTHER PUBLICATIONS

3rd Generation Partnership Project (3GPP), R2-073560, "MAC PDU Structure for LTE", NTT DoCoMo, Inc., NEC, 3GPP TSG RAN WG2 #59, Athens, Greece, Aug. 20-24, 2007, 4 pages.
(Continued)

*Primary Examiner* — Farah Faroul
(74) *Attorney, Agent, or Firm* — Condo Roccia Koptiw LLP (57) ABSTRACT

A wireless transmit/receive unit (WTRU) may receive configuration indicating that it is configured for a short DRX cycle. The WTRU may stop discontinuous reception (DRX) timers that are running and that are related to uplink and/or downlink transmissions during a DRX time period. The WTRU stops the DRX timers in response to receiving a medium access control (MAC) control element signal from an eNode-B. Based on a DRX MAC control element, the WTRU may enter a short DRX cycle. Based on a DRX MAC control element, the WTRU may enter a long DRX cycle.

10 Claims, 7 Drawing Sheets

Related U.S. Application Data continuation of application No. 13/904,189, filed on May 29, 2013, now Pat. No. 9,402,229, which is a continuation of application No. 12/402,767, filed on Mar. 12, 2009, now Pat. No. 8,488,521.

(60) Provisional application No. 61/036,833, filed on Mar. 14, 2008.

(51) Int. Cl.
   *H04W 76/04* (2009.01)
   *H04W 72/04* (2009.01)
   *H04W 76/28* (2018.01)
   *H04W 88/08* (2009.01)

(52) U.S. Cl.
   CPC ..... *H04W 72/042* (2013.01); *H04W 72/0446* (2013.01); *H04W 76/048* (2013.01); *H04W 76/28* (2018.02); *H04W 88/08* (2013.01); *Y02D 70/00* (2018.01); *Y02D 70/1262* (2018.01); *Y02D 70/142* (2018.01); *Y02D 70/144* (2018.01); *Y02D 70/24* (2018.01); *Y02D 70/25* (2018.01)

(56) References Cited

U.S. PATENT DOCUMENTS

| | | |
|---|---|---|
| 8,270,932 B2 | 9/2012 | Kim et al. |
| 8,320,287 B2 | 11/2012 | Cai et al. |
| 9,420,533 B2 | 8/2016 | Wu et al. |
| 9,756,679 B2* | 9/2017 | Sadek ................. H04W 76/048 |
| 9,872,334 B2* | 1/2018 | Jha ...................... H04W 76/048 |
| 2005/0176474 A1 | 8/2005 | Lee et al. |
| 2007/0161384 A1 | 7/2007 | Terry |
| 2007/0230394 A1 | 10/2007 | Wang et al. |
| 2007/0291728 A1 | 12/2007 | Dalsgaard et al. |
| 2008/0039094 A1 | 2/2008 | Jeong et al. |
| 2008/0117891 A1 | 5/2008 | Damnjanovic et al. |
| 2008/0186892 A1 | 8/2008 | Damnjanovic |
| 2008/0207247 A1 | 8/2008 | Gholmieh et al. |
| 2009/0074090 A1 | 3/2009 | Xu et al. |
| 2009/0232118 A1 | 9/2009 | Wang et al. |
| 2009/0238105 A1 | 9/2009 | Wu et al. |
| 2009/0285141 A1 | 11/2009 | Cai et al. |
| 2009/0316638 A1 | 12/2009 | Yi et al. |
| 2010/0037114 A1 | 2/2010 | Huang et al. |
| 2010/0110897 A1 | 5/2010 | Chun et al. |
| 2010/0208660 A1 | 8/2010 | Ji |
| 2011/0059745 A1 | 3/2011 | Yi et al. |
| 2011/0075558 A1 | 3/2011 | Isaksson et al. |
| 2011/0183663 A1 | 7/2011 | Kenehan et al. |
| 2011/0199910 A1 | 8/2011 | Oh et al. |
| 2011/0223883 A1 | 9/2011 | Ishii et al. |
| 2011/0292851 A1 | 12/2011 | Fong et al. |
| 2012/0002635 A1 | 1/2012 | Chung et al. |
| 2012/0176950 A1 | 7/2012 | Zhang et al. |
| 2012/0195240 A1 | 8/2012 | Kim et al. |
| 2012/0327833 A1 | 12/2012 | Kim et al. |
| 2013/0242953 A1 | 9/2013 | Malkamäki et al. |
| 2013/0258919 A1 | 10/2013 | Damnjanovic |
| 2014/0185467 A1 | 7/2014 | Heo et al. |
| 2014/0295820 A1 | 10/2014 | Kim et al. |
| 2015/0078349 A1 | 3/2015 | He et al. |
| 2015/0181571 A1 | 6/2015 | Sungjun et al. |
| 2015/0250017 A1 | 9/2015 | Ingale et al. |
| 2015/0264645 A1 | 9/2015 | Virtej et al. |
| 2015/0282208 A1 | 10/2015 | Yi et al. |
| 2016/0366722 A1* | 12/2016 | Heo .................. H04W 52/0258 |

FOREIGN PATENT DOCUMENTS

| | | |
|---|---|---|
| CN | 1980452 A | 6/2007 |
| CN | 101035374 A | 9/2007 |
| KR | 10-2007-0101175 A | 10/2007 |
| TW | 2007-46676 A | 12/2007 |
| TW | I466470 B | 12/2014 |

OTHER PUBLICATIONS

3rd Generation Partnership Project (3GPP), R2-074531, "Text Proposal for MAC Agreements", MAC Rapporteurs (Qualcomm Europe, Ericsson), 3GPP TSG-RAN WG2 #59bis, Shanghai, China, Aug. 12-16, 2007, 9 pages.

3rd generation Partnership Project (3GPP), R2-080631, "E-UTRA MAC Protocol Specification Update", MAC Rapporteurs (Ericsson, Qualcomm Europe), Change Request, 36.321, CR CRNum, Current Version: 8.0.0, 3GPP TSG-RAN2 Meeting #60bis, Sevilla, Spain, Jan. 14-18, 2008, 24 pages.

3rd Generation Partnership Project (3GPP), R2-080809, "Uplink Activities in DRX", Research in Motion Limited, 3GPP TSG-RAN-WG2 Meeting #61, Sorrento, Italy, Feb. 11-15, 2008, 2 pages.

3rd Generation Partnership Project (3GPP), R2-080858, "Open Issues on DRX Handling", Huawei, 3GPP TSG RAN WG2 #61, Sorrento, Italy, Feb. 11-15, 2008, 2 pages.

3rd Generation Partnership Project (3GPP), R2-080934, "Details of MAC DRX Control", Ericsson, TSG-RAN WG2 Meeting #61, Sorento, Italy, Feb. 11-15, 2008, 5 pages.

3rd Generation Partnership Project (3GPP), R2-081389, "E-UTRA MAC Protocol Specification Update", MAC Rapporteurs (Qualcomm Europe, Ericsson), 3GPP TST-RAN2 Meeting #61, Sorrento, Italy, Feb. 11-15, 2008, 25 pages.

3rd Generation Partnership Project (3GPP), RP-080162, "E-UTRA MAC Protocol Specification Update", MAC Rapporteurs (Qualcomm Europe, Ericsson), 3GPP TSG RAN Meeting #39, Puerto Vallarta, Mexico, Mar. 4-7, 2008, 4 pages.

3rd Generation Partnership Project (3GPP), TS 25.301 V.6.6.0, "Technical Specification Group Radio Access Network, Radio Interface Protocol Architecture (Release 6)", Mar. 2008, 48 pages.

3rd Generation Partnership Project (3GPP), TS 25.301 V.7.3.0, Technical Specification Group Radio Access Network, Radio Interface Protocol Architecture (Release 7), Sep. 2007, 49 pages.

3rd Generation Partnership Project (3GPP), TS 25.301 V.7.4.0, Technical Specification Group Radio Access Network, Radio Interface Protocol Architecture (Release 7), Mar. 2008, 49 pages.

3rd Generation Partnership Project (3GPP), TS 25.301 V.8.0.0, "Technical Specification Group Radio Access Network, Radio Interface Protocol Architecture (Release 8)", Dec. 2007, 49 pages.

3rd Generation Partnership Project (3GPP), TS 25.301 V.8.4.0, "Technical Specification Group Radio Access Network, Radio Interface Protocol Architecture (Release 8)", Dec. 2008, 52 pages.

3rd Generation Partnership Project (3GPP), TS 25.301 V6.5.0, "Technical Specification Group Radio Access Network, Radio Interface Protocol Architecture (Release 6)", Sep. 2007, 48 pages.

3rd Generation Partnership Project (3GPP), TS 36.321 V8.0.0, "Technical Specification Group Radio Access Network, Evolved Universal Terrestrial Radio Access (E-UTRA) Medium Access Control (MAC), protocol specification (Release 8)", Dec. 2007, 23 pages.

3rd Generation Partnership Project (3GPP), TS 36.321 V8.4.0, "Technical Specification Group Radio Access Network, Evolved Universal Terrestrial Radio Access (E-UTRA) Medium Access Control (MAC) protocol specification (Release 8)", Dec. 2008, 43 pages.

\* cited by examiner

BEHAVIOR FOR WIRELESS TRANSMIT/RECEIVE UNIT AND MAC CONTROL ELEMENTS FOR LTE DRX OPERATIONS

CROSS REFERENCE TO RELATED APPLICATIONS

This application is a continuation of U.S. patent application Ser. No. 15/180,524, filed Jun. 13, 2016, which is a continuation of U.S. patent application Ser. No. 13/904,189, filed May 29, 2013, which issued as U.S. Pat. No. 9,402,229 on Jul. 26, 2016, which is a continuation of U.S. patent application Ser. No. 12/402,767 filed on Mar. 12, 2009, which issued as U.S. Pat. No. 8,488,521 on Jul. 16, 2013, which claims the benefit of U.S. provisional application No. 61/036,833 filed on Mar. 14, 2008, which are all incorporated by reference as if fully set forth.

FIELD OF INVENTION

This application is related to wireless communications.

BACKGROUND

In the Third Generation Partnership Project (3GPP), discontinuous reception (DRX) is used between the network and a User Equipment (UE) to save the power of the UE. The UE may be configured by a radio resource control/media access control (RRC/MAC) with a DRX functionality that allows it to stop monitoring the packet data control channel (PDCCH) for a period of time (i.e., a sleep period). The DRX functionality consists of a long DRX cycle, a DRX inactivity timer, and a DRX retransmission timer. The DRX functionality optionally includes a short DRX cycle and a DRX short cycle timer, which are all defined in the 3GPP specification. The long DRX cycle provides a longer sleep period for the UE than does the short DRX cycle.

The active time is defined as the time that the UE is awake. When DRX is configured by a higher layer, this includes the on duration, which is the time that the UE is continuously monitoring the PDCCH while the DRX inactivity timer has not expired, and the time that the UE is continuously monitoring the PDCCH while any DRX retransmission timer is running.

Figure 1:
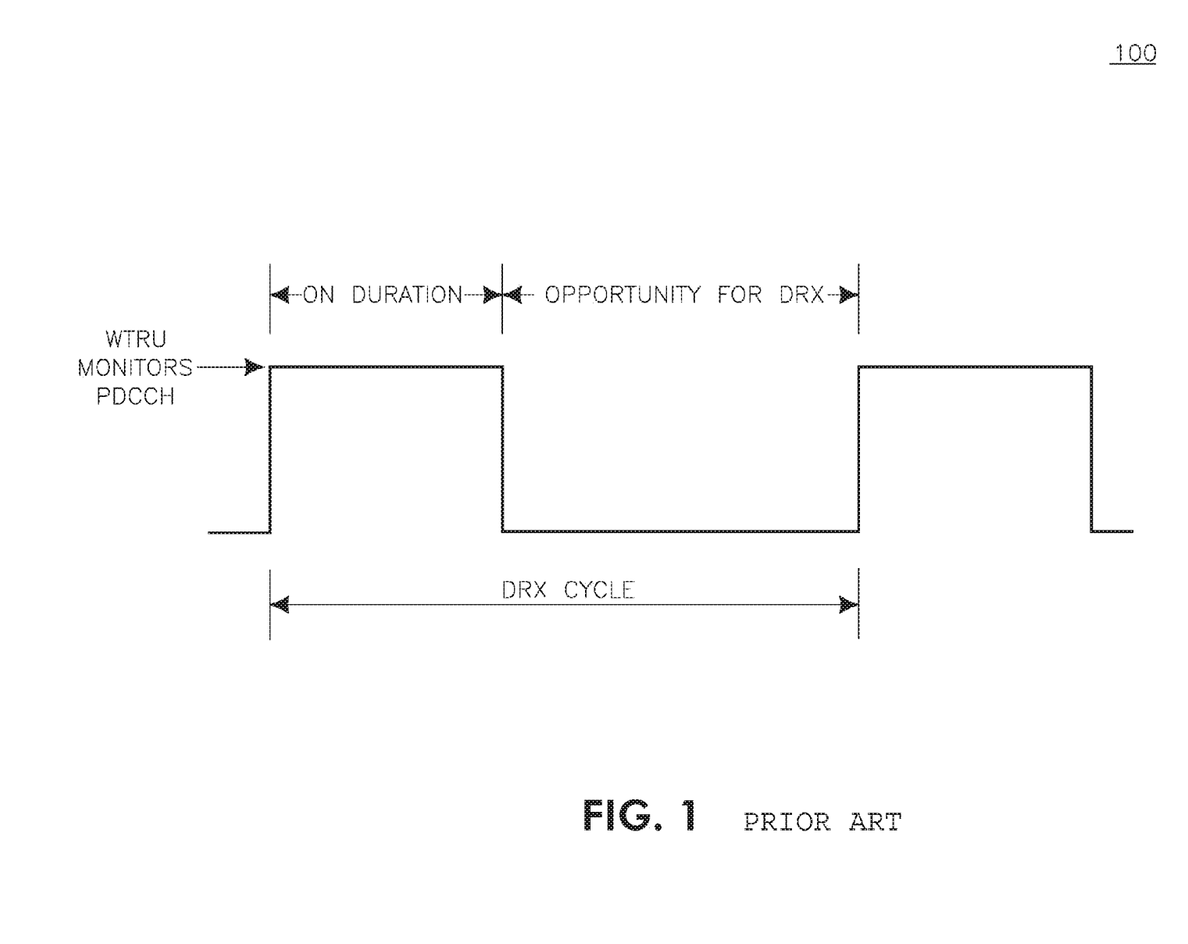
FIG. 1 shows an example DRX Cycle.

As shown in FIG. 1, the DRX cycle specifies the periodic repetition of the on duration followed by a possible period of inactivity. The DRX inactivity timer specifies the number of consecutive transmission time intervals (TTIs) during which the UE monitors the PDCCH after successfully decoding a PDCCH transmission which indicates an initial uplink or downlink user data transmission for the UE. This DRX inactivity timer is restarted if a new PDCCH transmission is detected while the timer is still running. Expiration of the DRX inactivity timer indicates that a particular duration of inactivity has elapsed for receiving any PDCCH transmission. The DRX retransmission timer specifies the maximum number of consecutive TTIs the UE monitors the PDCCH when a downlink retransmission is expected by the UE. The DRX short cycle timer specifies a number of consecutive TTIs that the UE shall follow the short DRX cycle after the DRX inactivity timer has expired. The hybrid automatic repeat-request (HARQ) round-trip time (RTT) timer specifies the minimum amount of TTIs before a downlink HARQ retransmission is expected by the UE. The DRX on duration timer specifies a number of consecutive PDCCH subframes at the beginning of a DRX cycle and specifies the number of consecutive TTIs during which the UE monitors the PDCCH for possible allocations. The DRX on duration is a part of a DRX cycle.

As mentioned above, the UE may be configured by the RRC/MAC with a DRX functionality that allows it to stop monitoring PDCCH during some period of time. Regardless of whether the UE is monitoring PDCCH, the UE receives and transmits HARQ feedback when such is expected.

Figure 2:
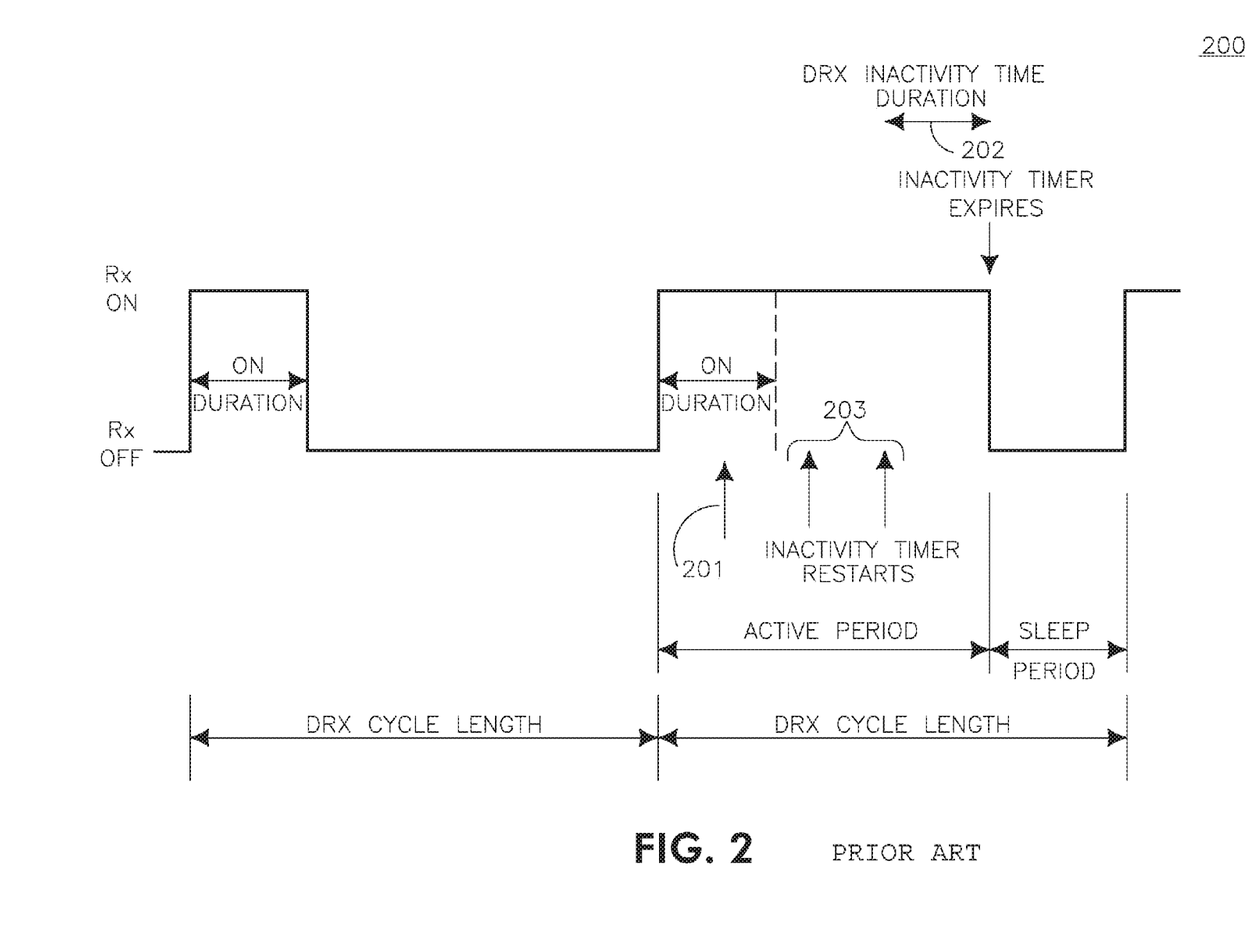
FIG. 2 illustrates an example of uncertainties related to a DRX inactivity timer operation.

FIG. 2 illustrates an example DRX cycle timing diagram 200, as a demonstration of problems that may arise with interworking of the various DRX timers during the selection of a short DRX cycle or a long DRX cycle. As shown in FIG. 2, an initial DRX inactivity timer start 201 can occur during any subframe or TTI within the DRX on duration. The DRX inactivity timer duration 202 is fixed. However, due to the uncertainty of the first start of the first DRX inactivity timer 201, as well as the unknown number of DRX inactivity timer restarts 203 that may be required, the DRX inactivity timer expiration is uncertain to both the eNode-B and the UE. If the DRX short cycle timer is configured to start when the DRX inactivity timer expires, then the new DRX short cycle timer will start at an uncertain subframe or TTI. As a result, the eNode-B does not know with certainty when the short DRX cycle timer starts and the short DRX cycle may no longer be aligned with the long DRX cycle.

SUMMARY

A method and apparatus is disclosed for selection of DRX short cycle or DRX long cycle, starting a short DRX cycle timer, controlling termination and expiration of DRX timers, and handling MAC control elements defined to control these DRX parameters. The method and apparatus are applicable to RRC_Connected mode for both downlink and uplink transmissions.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "base station" includes but is not limited to a Node-B, a site controller, an access point (AP), or any other type of interfacing device capable of operating in a wireless environment.

Figure 3:
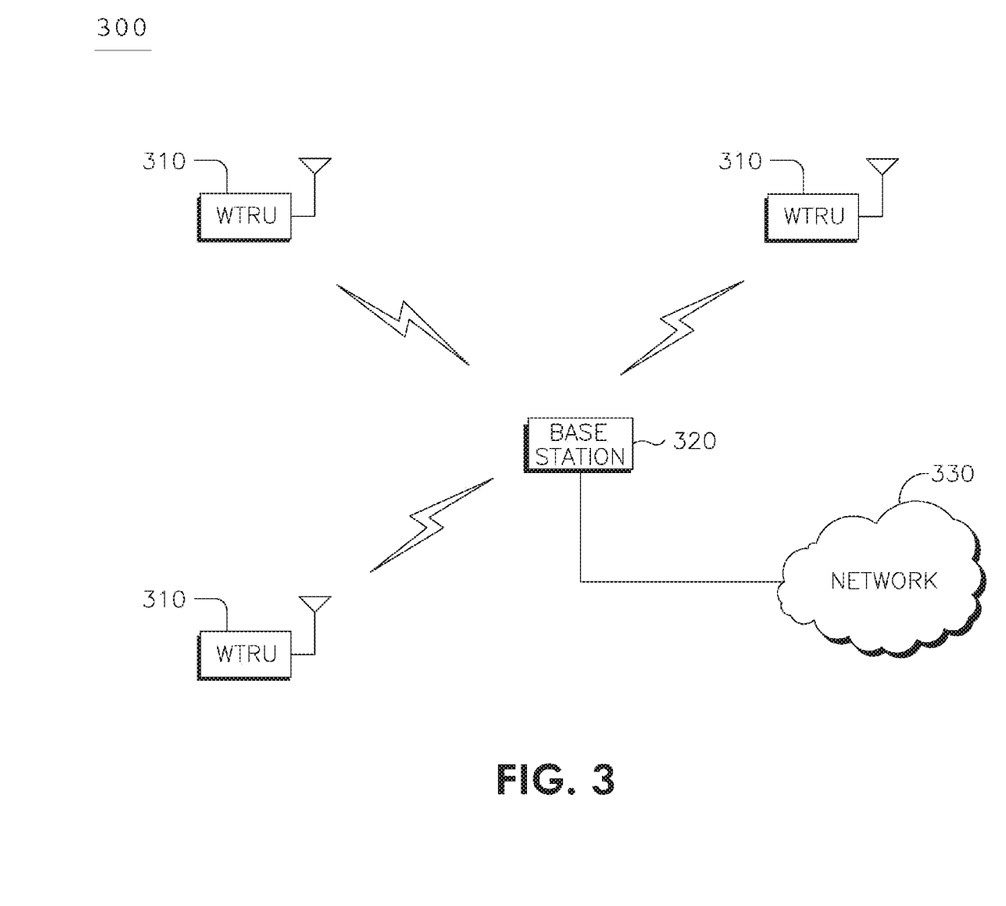
FIG. 3 shows an example wireless communication system including a plurality of wireless transmit/receive units (WTRUs) and a base station.

FIG. 3 shows a wireless communication system 300 including a plurality of WTRUs 310, and a base station 320. As shown in FIG. 3, the WTRUs 310 are in communication with the base station 320, and the base station 320 is in communication with a network 330. Although three WTRUs 310 and base station 320 are shown in FIG. 3, it should be noted that any combination of these wireless devices may be included in the wireless communication system 300.

Figure 4:
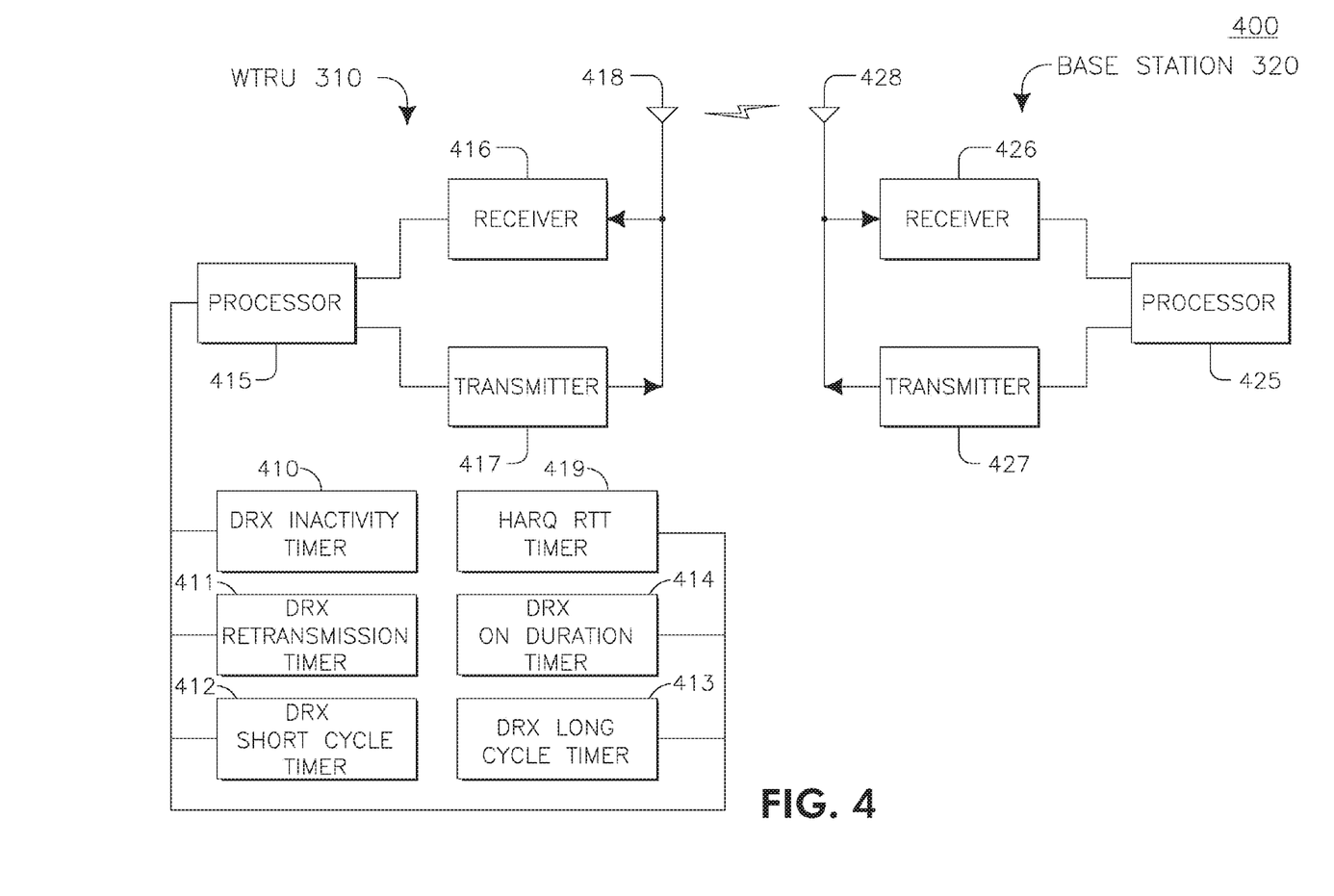
FIG. 4 is a functional block diagram of a WTRU and the base station of FIG. 3.

FIG. 4 is a functional block diagram 400 of the WTRU 310 and the base station 320 of the wireless communication system 300 shown in FIG. 3. As shown in FIG. 4, the WTRU 310 is in communication with the base station 320. In addition to the components that may be found in a typical WTRU, the WTRU 310 includes a processor 415, a receiver 416, a transmitter 417, and an antenna 418. The processor 415 is configured to perform the methods disclosed herein for setting DRX timers and selecting DRX cycle lengths during RRC_Connected mode, in conjunction with the DRX timers: a DRX inactivity timer 410, a DRX retransmission timer 411, a DRX short cycle timer 412, a DRX long cycle timer 413, a DRX on duration timer 414, and a HARQ RTT timer 419. The receiver 416 and the transmitter 417 are in communication with the processor 415. The antenna 418 is in communication with both the receiver 416 and the transmitter 417 to facilitate the transmission and reception of wireless data.

In addition to the components that may be found in a typical base station, the base station 320 includes a processor 425, a receiver 426, a transmitter 427, and an antenna 428. The processor 425 is configured to define and send MAC control elements for controlling the WTRU DRX cycles during RRC_Connected mode. The receiver 426 and the transmitter 427 are in communication with the processor 425. The antenna 428 is in communication with both the receiver 426 and the transmitter 427 to facilitate the transmission and reception of wireless data.

In a first embodiment, the WTRU 310 behavior is defined for operation of the DRX short cycle timer 412, the DRX long cycle timer 413, the short DRX cycle, and the long DRX cycle with respect to expiration of DRX inactivity timer 410. Here, the DRX short cycle timer 412 starts from a known time boundary, such as a predefined time when the short DRX cycle should start. The DRX short cycle timer 412 does not start immediately when the DRX inactivity timer expires 410. Instead, the DRX short cycle timer 412 is triggered following expiration of the DRX inactivity timer 410, at a subframe or TTI that is a known time boundary for the DRX short cycle timer 412 to be triggered. In this way, the short DRX cycle can be easier synchronized with the long DRX cycle.

The following presents several options for the WTRU 310 to deal with different scenarios for the DRX cycle timers.

In a first scenario, a DRX long cycle timer is utilized in addition to the DRX short cycle timer. The DRX long cycle timer is a parameter that specifies the number of consecutive subframe(s) the WTRU 310 shall follow the long DRX cycle after the DRX Inactivity Timer has expired. In this embodiment, both the DRX long cycle timer 413 and the DRX short cycle timer 412 are both running simultaneously, each timer having started at the beginning of the configured DRX cycle. As such, the DRX short cycle timer 412 is not triggered by other factors, and starts and expires autonomously (e.g., irrespective of whether the DRX inactivity timer 410 expires). The DRX short cycle timer 412 is aligned with the start of the long DRX cycle (and is a fraction of long DRX cycle) until the end of the configured DRX cycle.

Figure 5:
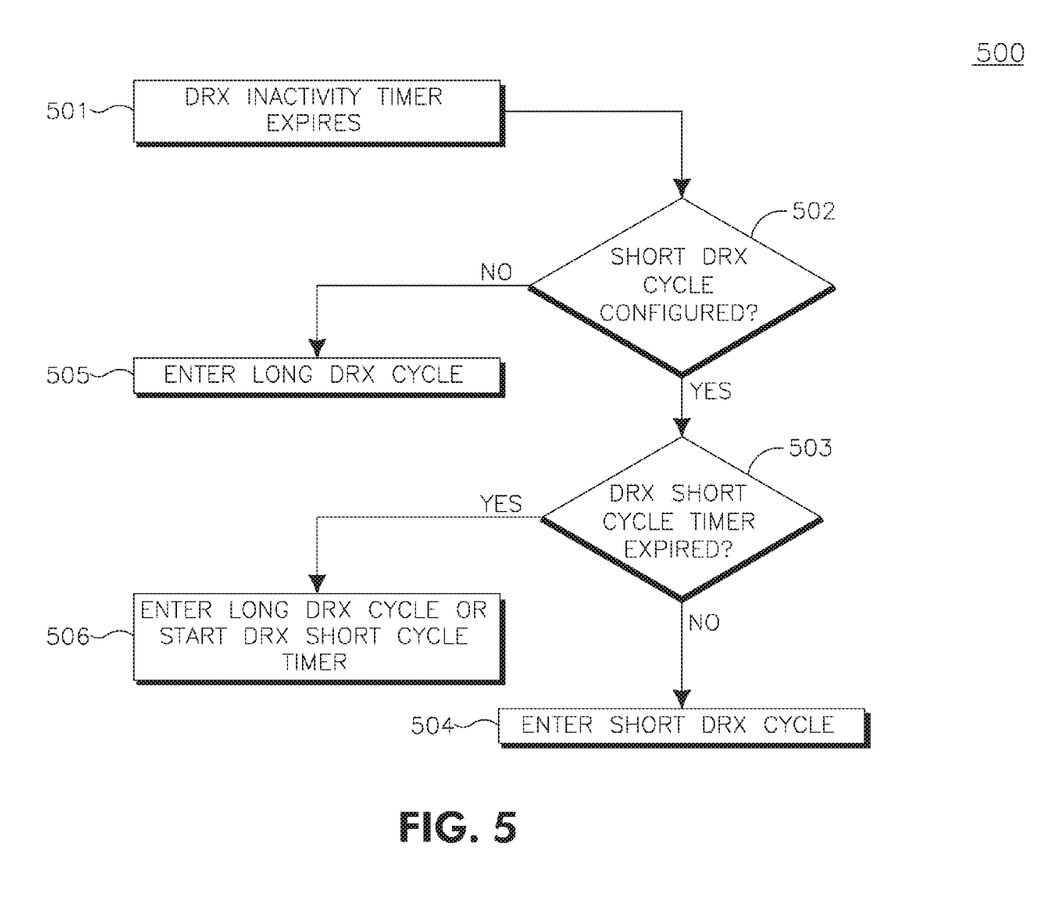
FIG. 5 shows method flow chart for selection of short DRX cycle and long DRX cycle when a DRX inactivity timer expires according to a first embodiment.

FIG. 5 shows a method flowchart 500 for operation of the DRX cycle timers under the first scenario, when the DRX inactivity timer 410 expires. At 501, the DRX inactivity timer 410 expires in the downlink subframe. Then a determination is made as to whether the short DRX cycle is configured at 502. The processor 415 enters the long DRX cycle at 505 if the short DRX cycle is not configured. If the short DRX cycle is configured, the WTRU processor 415 determines if the DRX short cycle timer 412 has expired at 503. If the DRX short cycle timer 412 has not expired, then the processor 415 enters the short DRX cycle at 504. The processor 415 enters the long DRX cycle or starts the DRX short cycle timer 412 at 506 if the DRX short cycle timer 412 has expired at 503. Whether to use the long DRX cycle or to start the DRX short cycle timer 412 at 506 may be pre-programmed or configured by the eNode-B 320 for either option during the RRC setup process. If the DRX short cycle timer option is implemented and it expires in the downlink subframe, then the processor 415 uses the long DRX cycle.

In a second scenario, both the DRX long cycle timer 413 and the DRX short cycle timer 412 are started at the beginning of the configured DRX cycle, and the DRX short cycle timer 412 may be terminated by the eNode-B 320. For example, the eNode-B 320 may send a MAC control element (CE) with an instruction for the WTRU 310 to terminate the DRX short cycle timer. Once the DRX short cycle timer 412 is terminated, the processor 415 will restart the DRX short cycle timer 412 and use the short DRX cycle.

In a third scenario, the long DRX cycle is used before triggering any short DRX cycle. In other words, the long DRX cycle is the default DRX cycle.

The following approach is utilized to achieve synchronization in the second and the third scenarios. The elapsed time of the DRX long cycle timer 413 for the WTRU 310 is used to determine whether to enter the short DRX cycle or the long DRX cycle or to start the DRX short cycle timer 412. It is assumed that one long DRX cycle is N times the length of one short DRX cycle (e.g., N(short DRX cycle length)), the relationship can be given as follows:

$$\text{Long } DRX \text{ cycle length} = N(\text{short } DRX \text{ cycle length})$$

where N is an integer.

Figure 6:
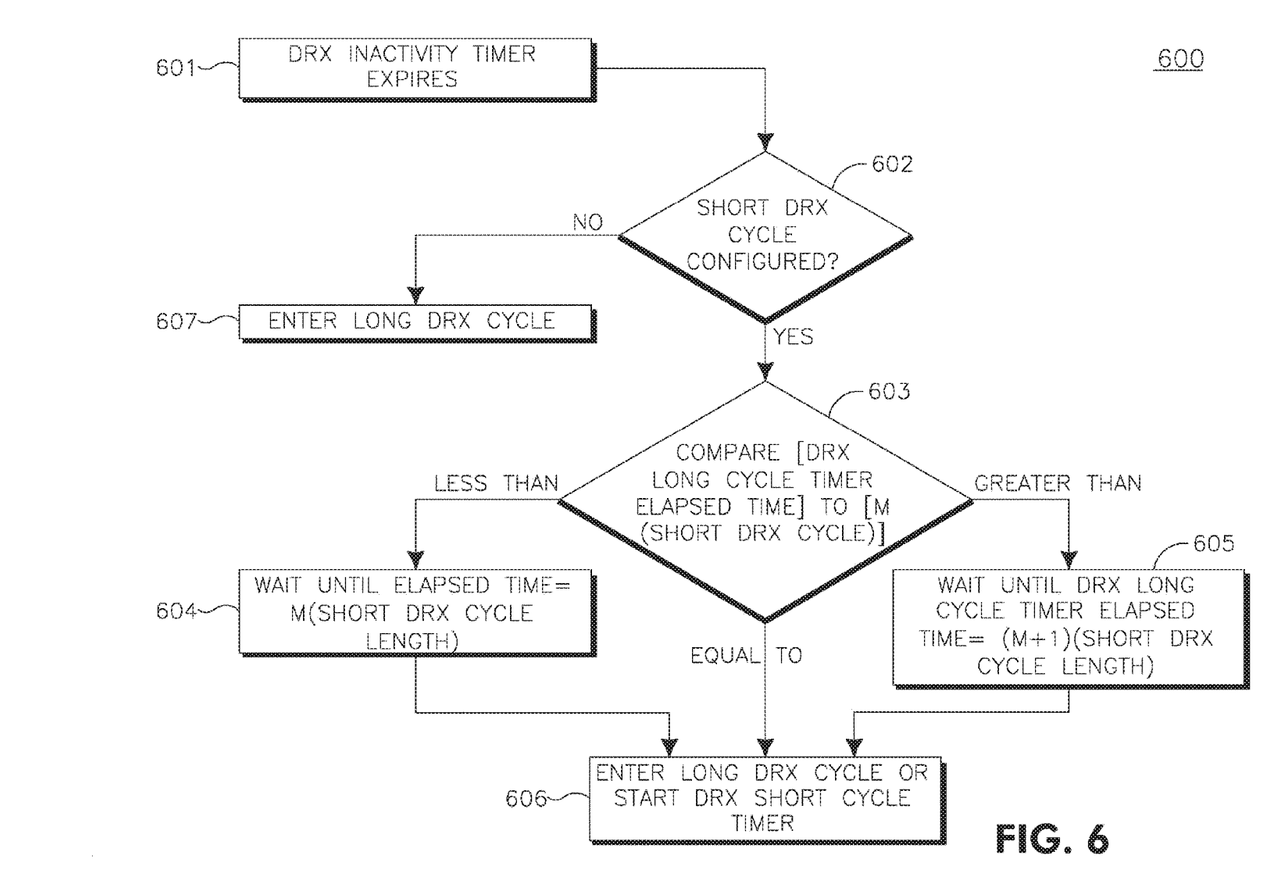
FIG. 6 shows a method flow chart for selection of short DRX cycle and long DRX cycle when a DRX inactivity timer expires according to a second embodiment.

FIG. 6 shows a method flow chart for the WTRU 310 entering the long DRX cycle or the short DRX cycle in the case of the second or the third scenarios. For a current downlink frame, upon the DRX inactivity timer 410 expiring at 601, a determination is made at 602 as to whether the short DRX cycle is configured. If the short DRX cycle is configured, the processor 415 compares the elapsed time from the start of the DRX long cycle timer 413 at 603 against the short DRX cycle length. If the DRX long cycle timer 413 elapsed time is equal to M(short DRX cycle length), where M is an integer and M≤N, then the processor 415 starts the DRX short cycle timer 412 at 606. Alternatively at 606, the processor 415 may enter the long DRX cycle. Whether to use the long DRX cycle or to start the DRX short cycle timer may be pre-programmed or may be configured by the eNode-B 320 for either option during the RRC setup process. If at 603, the processor 415 determines the DRX long cycle timer 413 elapsed time is less than M(short DRX cycle length), then the processor 415 waits until the elapsed time is equal to M(short DRX cycle length) at 604, before starting the DRX short cycle timer 412 or entering the long DRX cycle at 606. Alternatively, for DRX long cycle timer 413 elapsed time greater than M(short DRX cycle length) at 603, the processor 415 waits until the subframe or TTI where the DRX long cycle timer 413 elapsed time equals (M+1)(short DRX cycle length), then starts the DRX short cycle timer 412 or enters the long DRX cycle at 606. The processor 415 may enter the long DRX cycle at 606 without starting DRX short cycle timer 412.

Returning to the initial decision as to whether the short DRX cycle is configured at 602, the WTRU enters the long DRX cycle at 607 if the short DRX cycle is not configured.

Figure 7:
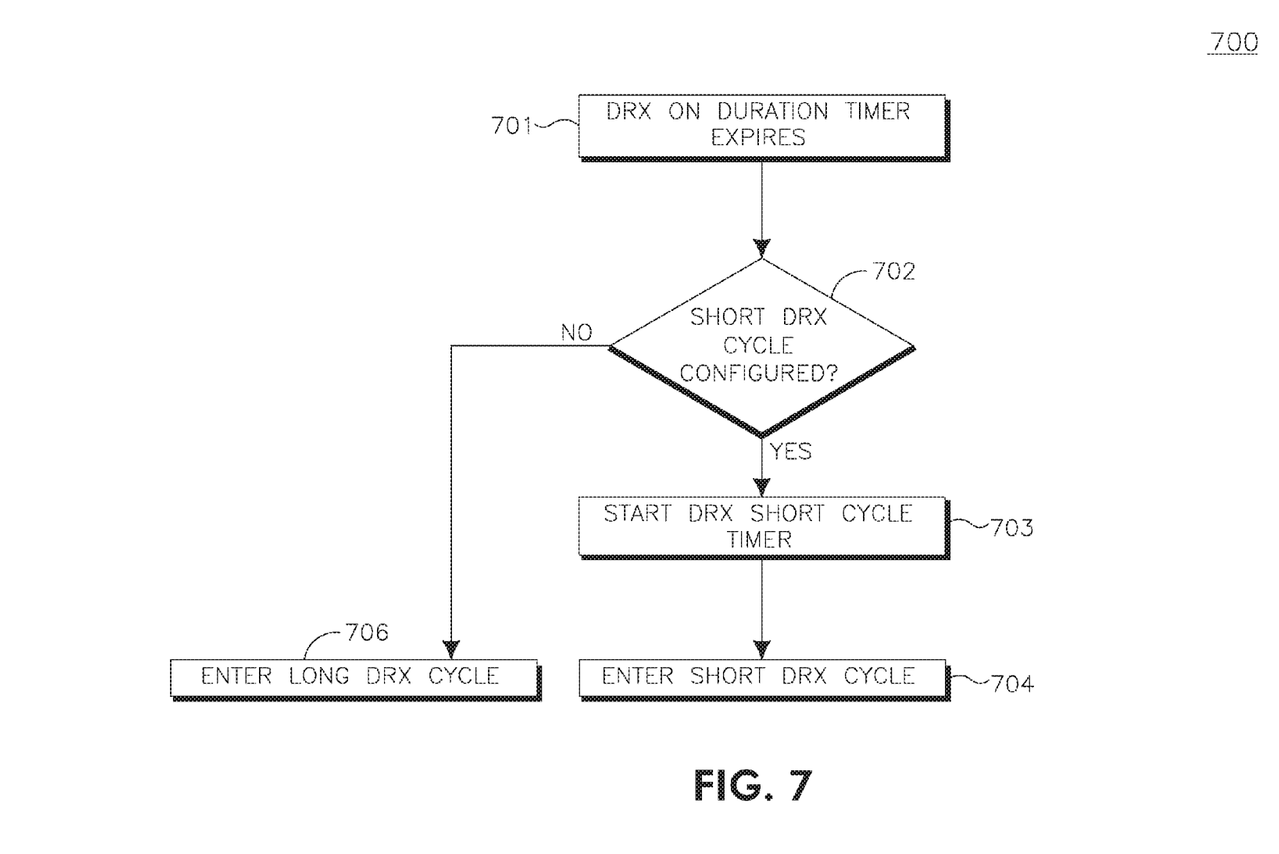
FIG. 7 shows a method flow chart for selection of short DRX cycle and long DRX cycle when a DRX on duration timer expires.

In a second embodiment, the WTRU behavior is defined for operation of the DRX short cycle timer 412, the DRX long cycle timer 413, the short DRX cycle, and the long DRX cycle with respect to expiration of the DRX on duration timer 414. FIG. 7 shows a method flow chart 700 for the WTRU processor 415 to select the short DRX cycle or the long DRX cycle when the DRX on duration timer 414 expires. After the DRX on duration timer 414 expires in the downlink subframe at 701, the processor 415 determines whether the short DRX cycle is configured at 702. If the short DRX cycle is configured, then the processor 415 starts the DRX short cycle timer 412 at 703 and the WTRU processor 415 enters the short DRX cycle at 704. If the short DRX cycle is not configured at 702, the WTRU processor 415 enters the long DRX cycle at 706.

Alternatively, the processor 415 may start the DRX short cycle timer 412 (at 703) at the subframe when elapsed time from the start of current long DRX cycle is equal to an integer N times the short DRX cycle length (i.e., N(short DRX cycle length)).

In a variation of this embodiment, the WTRU processor 415 may directly enter the long DRX cycle upon expiration of the DRX on duration timer 414 in the downlink subframe, irrespective of whether the short DRX cycle is configured in 702.

In a third embodiment, a DRX MAC CE is defined to signal the WTRU 310 to terminate any running DRX timers and WTRU behavior is defined for responding to receiving a DRX MAC CE. In a first scenario for this embodiment, a DRX command is defined as a MAC CE to signal the WTRU 310 to stop the DRX on duration timer 414 and the DRX inactivity timer 410. This is an indication to the WTRU processor 415 that it can stop monitoring and decoding the PDCCH for initial transmissions for the remainder of the current DRX cycle. In response, the WTRU 310 behaviour is defined as follows.

When a DRX cycle has been configured and the WTRU 310 receives a MAC PDU on a downlink-shared channel (DL-SCH) that contains a DRX CE, the DRX on duration timer 414 and the DRX inactivity timer 410 are stopped during the subframe or TTI. If there are no other timers (e.g., a DRX retransmission timer) running when the DRX on duration timer 414 and the DRX inactivity timer 410 are stopped in this subframe or TTI, and if the short DRX cycle is configured, the processor 415 starts the DRX short cycle timer 412 and uses the short DRX cycle. If the short DRX cycle is not configured, the processor 415 enters the long DRX cycle.

As a variation to this embodiment, if the DRX on duration timer 414 is terminated for a predetermined number of consecutive times and no DRX inactivity timer 410 is running, then the WTRU starts the DRX long cycle timer 413.

A MAC control element (CE) may be defined to stop any or all running timers related to downlink and uplink transmissions during a DRX cycle. There may be different types of MAC CEs defined to distinguish the stop of any or all running timers related to uplink transmissions and downlink transmissions during DRX operations. For example, if the WTRU 310 receives a downlink related DRX MAC CE, then the WTRU processor 415 stops all related timers (e.g., the DRX on duration timer 414, the DRX inactivity timer 410, the DRX retransmission timer 411 and HARQ RTT timer 419.) The WTRU 310 also suspends all downlink related reception and flushes the data saved in the HARQ buffer. Conversely, if the WTRU 310 receives an uplink related DRX MAC CE, then WTRU processor 415 stops all timers related to the uplink transmission during the DRX period. The WTRU 310 also suspends all uplink related reception and flushes the data saved in the buffer.

There may be several types of DRX MAC CE, or the DRX MAC CE can be used for certain purposes to stop DRX timers. By way of example, the DRX MAC CE may only force downlink related DRX timers to stop; only force uplink related DRX timers to stop, or force all DRX related timers (downlink/uplink) to stop.

No matter what type of DRX MAC CE is used, when the DRX MAC CE is used to force the WTRU 310 to re-enter the DRX sleep period as described above, the following options are available for the WTRU processor 415 to predict whether to enter a short DRX cycle or a long DRX cycle. In a first option, the eNode-B 320 transmits a DRX MAC CE signal to the WTRU 310. The signal explicitly notifies the WTRU 310 as to whether it should enter a short DRX cycle or a long DRX cycle. A one-bit indication in the DRX MAC CE can be used for this explicit signaling. As a second option, the DRX MAC CE only stops the DRX related timers, and then the WTRU 310 enters a short DRX cycle. As a third option, the DRX MAC CE only stops the DRX related timers, and then the WTRU processor 415 enters a long DRX cycle.

Further, when the uplink related activity timer expires or is stopped, if the short DRX cycle is configured, then the WTRU processor 415 starts the DRX short cycle timer and uses the short DRX cycle. If the short DRX cycle is not configured, then the WTRU processor 415 uses the long DRX cycle.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general-purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for a wireless transmit receive unit (WTRU) to perform discontinuous reception (DRX), the method comprising:
   the WTRU operating a DRX on duration timer, wherein the DRX on duration timer specifies a number of consecutive physical downlink control channel (PDCCH) subframes at a beginning of a DRX cycle;
   the WTRU operating a DRX inactivity timer, wherein the DRX inactivity timer is indicative of a number of consecutive transmission time intervals (TTIs) during which the WTRU monitors a PDCCH after successfully decoding a PDCCH transmission that indicates an initial uplink or downlink user data transmission for the WTRU;
   the WTRU receiving a configuration indicating that the WTRU is configured for a short cycle;
   the WTRU receiving a DRX medium access control (MAC) control element (CE);
   on a condition that the received DRX MAC CE is of a first type, the WTRU using a short DRX cycle; and
   on a condition that the received DRX MAC CE is of a second type, the WTRU using a long DRX cycle.

2. The method of claim 1, further comprising starting a DRX short cycle timer, upon receiving the DRX MAC CE of the first type.

3. The method of claim 2, further comprising stopping the DRX short cycle timer, upon receiving the DRX MAC CE of the second type.

4. The method of claim 1, wherein each of the DRX on duration timer and the DRX inactivity timer is stopped upon receiving the DRX MAC CE that is of the first type or the second type.

5. The method of claim 1, wherein the DRX MAC CE is associated with a downlink transmission.

6. A wireless transmit receive unit (WTRU) comprising:
   a processor that is configured to at least:
      operate a DRX on duration timer, wherein the DRX on duration timer specifies a number of consecutive physical downlink control channel (PDCCH) subframes at a beginning of a DRX cycle;
      operate a DRX inactivity timer, wherein the DRX inactivity timer is indicative of a number of consecutive transmission time intervals (TTIs) during which the WTRU monitors a PDCCH after successfully decoding a PDCCH transmission that indicates an initial uplink or downlink user data transmission for the WTRU;
   receive a configuration indicating that the WTRU is configured for a short cycle;
   receive a DRX medium access control (MAC) control element (CE);
      on a condition that the received DRX MAC CE is of a first type, use a short DRX cycle; and
      on a condition that the received DRX MAC CE is of a second type, use a long DRX cycle.

7. The WTRU of claim 6, wherein the processor is configured to start a DRX short cycle timer, upon receiving the DRX MAC CE of the first type.

8. The WTRU of claim 7, wherein the processor is configured to stop the DRX short cycle timer, upon receiving the DRX MAC CE of the second type.

9. The WTRU of claim 6, wherein each of the DRX on duration timer and the DRX inactivity timer is stopped upon receiving the DRX MAC CE that is of the first type or the second type.

10. The WTRU of claim 6, wherein the DRX MAC CE is associated with a downlink transmission.

* * * * *